United States Patent [19]
Rowlands

[11] Patent Number: 5,125,361
[45] Date of Patent: Jun. 30, 1992

[54] TREAD DRUM FOR ANIMALS

[76] Inventor: Scott D. Rowlands, 2201 - 9th St., East Moline, Ill. 61244

[21] Appl. No.: 667,666

[22] Filed: Mar. 11, 1991

[51] Int. Cl.⁵ .............................................. A01K 15/02
[52] U.S. Cl. .......................................... 119/29; 482/54
[58] Field of Search ................... 119/29, 15; 272/49, 272/38, 51, 33 R, 69, 115, 1 R, 1 E

[56] References Cited

U.S. PATENT DOCUMENTS

| | | | |
|---|---|---|---|
| 528,066 | 11/1894 | Ariens | 119/29 |
| 883,485 | 3/1908 | Ridgway | 272/1 R |
| 1,264,738 | 4/1918 | Woolard | 272/49 |
| 1,794,951 | 3/1931 | Freer | 119/29 |
| 2,640,460 | 6/1953 | Siegel | 119/29 |
| 2,681,638 | 6/1954 | Carvell | 119/29 |
| 3,057,328 | 10/1962 | Swartz | 119/29 |
| 3,536,324 | 10/1970 | Ahrens | 272/1 R |
| 3,682,477 | 8/1972 | Harkins | 119/29 |
| 3,716,029 | 2/1973 | Pillsbury | 119/29 |
| 3,788,277 | 1/1974 | Willinger et al. | 119/29 |
| 3,933,126 | 1/1976 | Gordon | 119/29 |
| 3,994,262 | 11/1976 | Suchowski et al. | 119/29 |
| 4,088,094 | 5/1978 | Howard | 119/29 |
| 4,389,047 | 6/1983 | Hall | 272/69 |
| 4,458,895 | 7/1984 | Turcotte | 272/115 |

FOREIGN PATENT DOCUMENTS

| | | | |
|---|---|---|---|
| 587096 | 10/1933 | Fed. Rep. of Germany | 272/33 R |
| 1146334 | 11/1957 | France | 272/49 |
| 2357280 | 2/1978 | France | 272/33 R |
| 2464732 | 4/1981 | France | 272/1 R |

Primary Examiner—Robert P. Swiatek
Assistant Examiner—Todd E. Manahan

[57] ABSTRACT

An animal tread wheel is provided which is lightweight, easily assembled and disassembled, and allows a handler to reach into the tread wheel from either side while the animal is running. The drum of the tread wheel is formed in four curved quarter-sections, wiht flanges at each section end. A roller guide track runs along each side of the quarter-sections. When the flanges are bolted together, the sections form a rigid, self-supporting drum. This drum then is placed on a base having rollers which ride in the guide tracks on the drum. Preferably, the rollers are simply inverted furniture casters. If desired, sides can be placed on the drum, allowing it to be used as a cage.

11 Claims, 2 Drawing Sheets

TREAD DRUM FOR ANIMALS

BACKGROUND OF THE INVENTION

1. Field of the Invention

This invention relates in general to tread wheels for animals, and more particularly to a tread wheel useful for exercising dogs.

2. Description of the Related Art

A variety of tread wheels or drums have heretofore been proposed for exercising animals. Many patents teach the basic tread drum concept.

U.S. Pat. No. 1,794,951 (Freer), issued Mar. 3, 1931, appears to be the first true animal exerciser, and shows one of the two typical styles of "hamster wheel", with a shaft supporting a drum via a disk or spider on one side of the drum. The structure taught by this patent, and others like it, is designed for small animals such as hamsters, rats and the like, though the Freer patent indicates that it also can be used for foxes and other furbearing animals.

The Freer design would be very expensive and impractical to build and utilize for larger animals such as dogs. Given the weight of a dog, the cantilevered support required for a large version of Freer's side-mounted tread wheel would require mounting to a very solid wall or structure.

U.S. Pat. No. 4,088,094 (Howard) utilizes a similar side-supported drum concept, but the drum is supported from a movable base, and was designed mainly for exercising monkeys. However, the base again must be quite substantial due to the side-mounted arrangement for the drum, and it would not be easy to disassemble the apparatus or move it if the floor casters under the base could not be used (e.g., up a staircase).

The other basic design of "hamster wheel" supports the drum on a central shaft that extends through the drum or wheel, with spokes or a spider assembly on each side of the drum. The central shaft then is supported on each side of the wheel. U.S. Pat. Nos. 3,057,328 (Swartz), 3,682,477 (Harkins), 3,788,277 (Willinger et al.) and 3,933,126 (Gordon) provide examples. U.S. Pat. No. 528,066 (Ariens) is similar, though strictly speaking it is a working treadmill, not just an exercise device.

A tread wheel with a central shaft requires a much larger drum for a given size animal than a side-mounted drum, since the animal must run between the central shaft and the drum. However, this design has the advantage that a less substantial mounting structure can be used, since the drum is not cantilevered.

U.S. Pat. No. 3,994,262 (Suchowski et al.) combined the two foregoing concepts by splitting the central shaft in two. In this design, the drum is mounted on shafts on either side of the drum, but the shafts do not extend through the middle of the drum.

U.S. Pat. No. 2,681,638 (Carvell) teaches the basic concept of the "hamster ball", that is a non-stationary exercise drum or ball. In Carvell's design, an animal is caged inside a drum or ball which is then free to roll around on the floor as the animal runs inside the drum. While this might be cute with a hamster-sized drum or ball, with a dog-sized drum or ball the results could be disastrous.

U.S. Pat. No. 2,640,450 (Siegel) somewhat overcomes this drawback by rotatably mounting drums such as Carvell's in a stand. However, Siegel's structure would not be easily moved or disassembled if scaled up to accommodate a dog.

Finally, U.S. Pat. No. 883,485 (Ridgway) shows an amusement park treadmill drum for people. Even if scaled down to dog size, Ridgway's device is not easily disassembled or transported, and requires numerous special purpose components, increasing its cost.

The foregoing exercising tread wheels suffer from a number of disadvantages:

(a) Most of the tread drums have been designed primarily for small animals of the rodent variety. By virtue of their designs, they would be cumbersome and costly to produce on a scale large enough for a dog. Specifically, if made on a scale large enough to suit a dog, they would not assemble and disassemble readily for shipping and moving in and out of human size doors. Side-mounted drums would require excessively heavy-duty supports, and central shaft mounted drums would be excessively large.

(b) Most of the previous tread drums are supported either from one side or by a central shaft. Either technique requires a spider assembly and central bearing of some sort. The spokes of the spider present a dangerous pinch point for the animal, as well as any humans standing close by. They also effectively prevent a human handler from reaching into the drum while it is moving to encourage or otherwise assist the dog.

SUMMARY OF THE INVENTION

It is an object of the present invention to provide a tread drum primarily for exercising dogs which can be assembled and disassembled easily, and which can be transported or moved easily when disassembled. It is a further object of the present invention to provide a tread drum that is completely self supporting when assembled, and which leaves both sides open with no supporting spokes. It is a still further object of the present invention to provide a tread drum that is simple, easy to construct, and economical for a large portion of the population, so that more people with dogs will be able to exercise them regularly, alleviating excessive energies of the dog and increasing the harmony and bond between dog and handler.

These objects are achieved according to the present invention by providing a drum that can come apart into two or more pieces for easy assembly and disassembly, but which assembles into a structurally self-supporting cylinder. Preferably, the drum is formed of several curved pieces, each ending in a flange which matches the corresponding flange on the adjacent piece. The flanges extend radially outward from the curved section so that they also serve as stiffening ribs. Bolting the flanges together then provides the necessary rigidity and support.

The drum is positionable on top of a base, and has guides built into it for rollers mounted on the base. Preferably, the guides are simply parallel U-shaped tracks and the rollers are common furniture casters, inverted so that their wheels face the drum. The U-shaped tracks also will then serve as to stiffen the drum.

If desired, sides open-wire mesh can be mounted on either side of the drum. This has the advantage that the drum then can optionally be used as a cage for the dog, while allowing the dog to get some exercise when desired.

The present invention has numerous advantages. The sides of the drum are completely open, so that a handler can reach into the drum while the drum is moving to hold food out or otherwise entice the dog to run. Lack of a central shaft or side mounting means that the drum is compact and lightweight for its size. The structure has no pinch points in which an animal might get caught, since there are no spiders, spokes or other similar supports. The structure uses readily available materials and therefore is low in cost, and the structure is easily disassembled and moved.

BRIEF DESCRIPTION OF THE DRAWINGS

The invention will be described in greater detail with reference to the following figures.

DETAILED DESCRIPTION OF THE PREFERRED EMBODIMENTS

Figure 1:
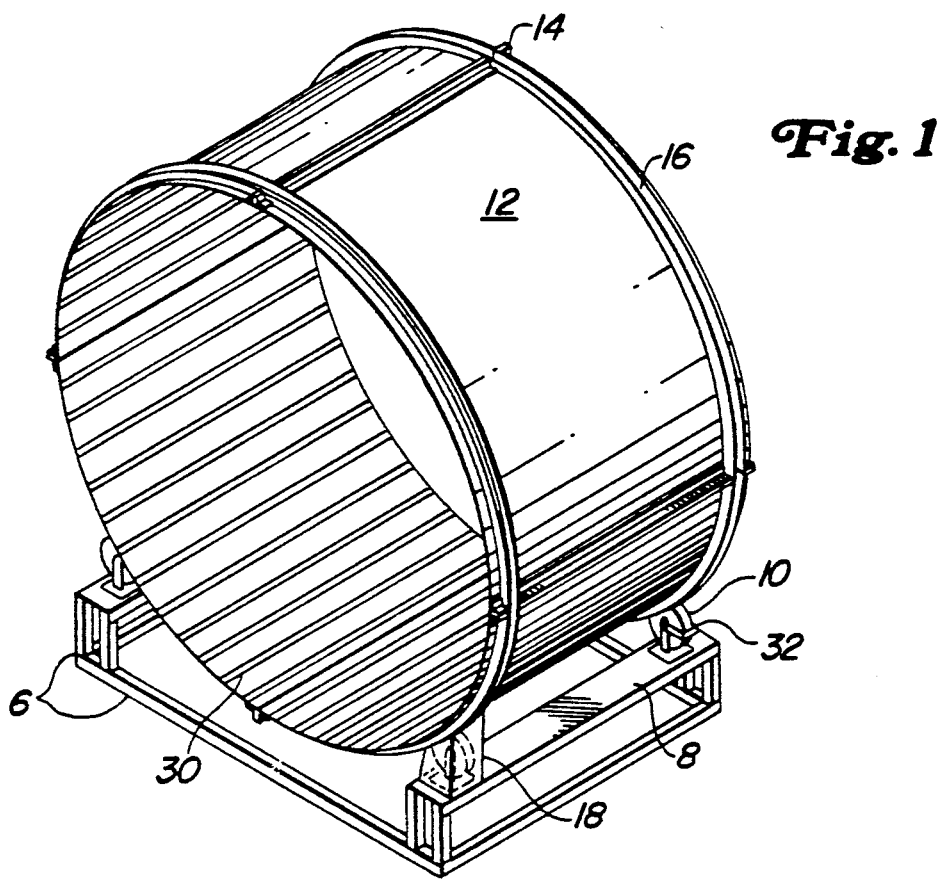
FIG. 1 is an isometric view of an animal tread drum according to the present invention.

Referring now to FIGS. 1-4, the drum is made up of four quarter-sections 12. Each quarter-section 12 has flanges 14 at each end thereof. The flanges 14 extend radially out from the quarter-section 12, so that they can serve a dual function as flanges and ribs. These flanges 14 are mated to the corresponding flanges 14 on the adjacent quarter-section 12, and then bolted together. Roller guides 16 are built into the side of each quarter-section 12, and preferably are simply U-shaped guides. The roller guides butt together when the flanges 14 are bolted together. As with the flanges 14, the roller guides 16 then can serve a dual function to stiffen the assembled drum. Once bolted together, the combination of the drum quarter-sections 12, flanges 14 and roller guides 16 provides a rigid structure fully capable of supporting a running dog.

The base 6 is formed of a plurality of suitable structural members, e.g., a flat plate or a set of square tubes, which are bolted together for easy assembly and disassembly, and are designed to hold the flat plate 8 which in turn holds the inverted caster rollers 10. The caster rollers 10 are positioned so that their wheels will fit in the roller guides 16 when the drum is placed on top of them. As will be apparent, the caster rollers 10 should be spaced far enough apart and up along the sides of the drum to ensure that the drum is stable in use.

Figure 2:
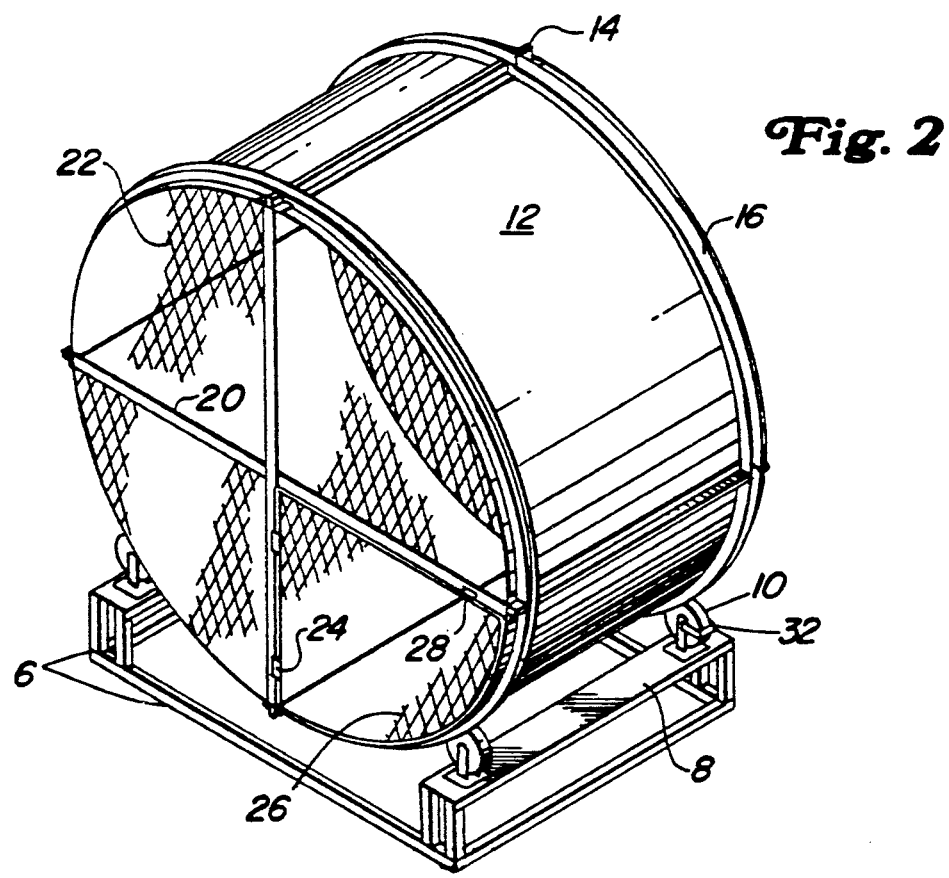
FIG. 2 is another isometric view of an animal tread wheel according to the present invention showing additional features for enclosing the tread wheel to utilize it as a cage.
Figure 3:
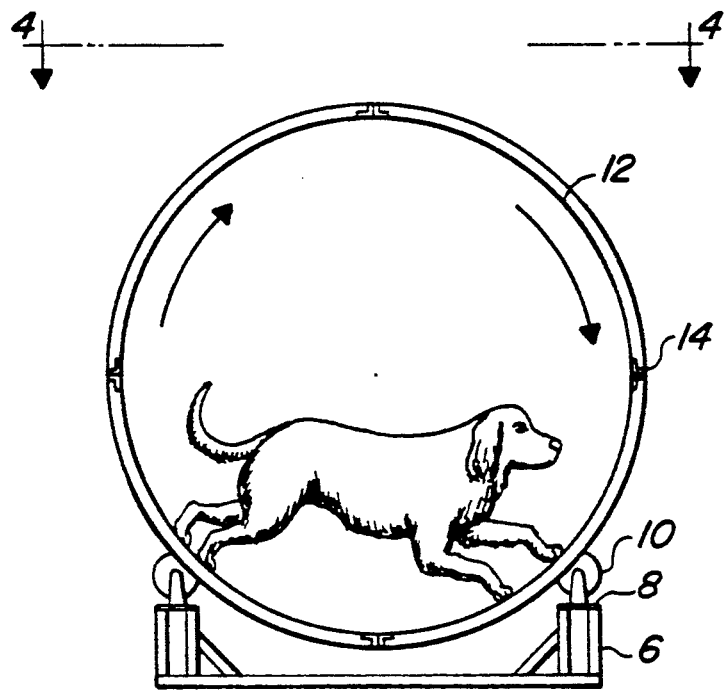
FIG. 3 is a front view of the tread drum of FIG. 1.
Figure 4:
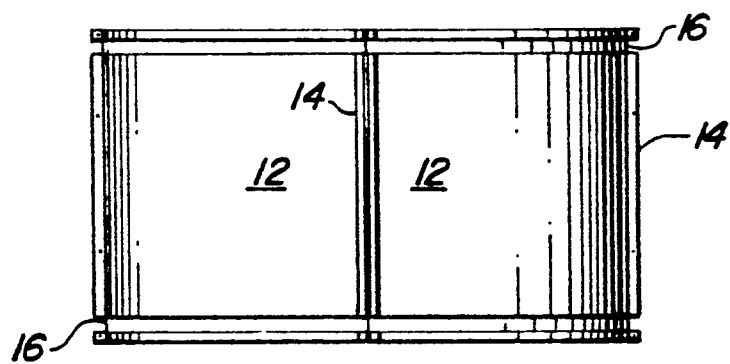
FIG. 4 is an enlarged detail view along line 4—4 in FIG. 3 of the top two quarter-sections of the drum, connecting flanges, and roller guides.

If desired, cage sides can be placed on the drum, as shown in FIG. 2. Diagonal cross-members 20 are mounted on both sides of the drum. On at least one side, three-quarters of the sections between the cross-members are covered with wire mesh 22. The fourth section is provided with a door 26 pivotally mounted by hinges 24 to one of the cross-members 20. The door 26 has a latch 28 which can latch to the other cross-member 20, or to a latch receiver mounted on the other cross-member 20. The opposite side of the drum can be provided with a similar arrangement (so that there is a door on each side of the drum), or can have all four quarters covered by solid mesh. Once an animal is shut inside of the cage, it is free to run and get exercise while caged up.

Returning to FIG. 1, a simple brake 32, e.g., of the type commonly found on caster rollers, can be applied to prevent the drum from rotating. If desired, wheel guards 18 can be provided to prevent a person or animal from getting pinched between the caster rollers 10 and the roller guides 16. Finally, the inside surface of the drum preferably is provided with a rough surface 30, e.g., carpet or rubber mats, on which the dog will not slide.

While the invention has been described in conjunction with a specific embodiment, it is to be understood that many alternatives, modifications and variations will be apparent to those skilled in the art in light of the foregoing description. For example, while the drum sections have been described as having flanges at their ends which are bolted together, any other suitable attachment mechanism could be provided, so long as it provided the necessary structural strength and ease of assembly. Similarly, the optional sides of the drum have been described as being mesh, but could be solid plastic (with suitable air holes), or any other suitable material. Accordingly, this invention is intended to embrace all alternatives, modifications and variations which fall within the spirit and scope of the appended claims.

I claim:

1. A tread wheel comprising:
   a) a plurality of curved sections, each section having:
      i) a flange at each end thereof extending substantially radially outward from said curved section; and
      ii) two substantially U-shaped tracks extending along the outer circumference of each said curved section;
   b) attachment means for selectively attaching the flange at the end of each section to the flange of an adjacent section, all of said sections together forming a self-supporting rigid cylindrical drum with said flanges and said U-shaped tracks serving as stiffening ribs when said flanges are attached together by said attachment means;
   c) a stationary base supporting a plurality of rollers for rolling in said U-shaped tracks, said drum rotating on said rollers.

2. A tread wheel comprising:
   a) a plurality of curved sections, each section having attachment means at each end thereof for selectively attaching said section to an adjacent section, all of said sections together forming a self-supporting rigid cylindrical drum when attached together by said attachment means, said attachment means comprising:
      i) a flange at each end of each curved section, each flange extending substantially radially outward from said drum and having a plurality of bolt holes therethrough; and
      ii) a plurality of bolts extending through said bolt holes and holding each flange to the corresponding flange on the adjacent curved section; and
   b) a stationary base supporting a plurality of rollers, said drum rotating on said rollers.

3. The tread drum of claim 2, further comprising roller guides formed on the outer circumference of said drum for guiding said rollers.

4. The tread drum of claim 3, wherein said roller guides comprise U-shaped tracks extending along the outer circumference of each curved section, ends of the guides on each curved section abutting corresponding ends of the guides on the adjacent curved sections to stiffen said drum and to form a complete guide track when said curved sections are assembled into said drum.

5. The tread drum of claim 2, further comprising side means for closing off the ends of said drum.

6. The tread drum of claim 5, wherein said side means comprises cross-members extending diagonally across the ends of said drum and covered with wire mesh.

7. The tread drum of claim 6, wherein said side means further comprises a selectively latchable door.

8. The tread drum of claim 2, wherein the inside surface of said drum is provided with a roughened surface.

9. The tread drum of claim 2, wherein each roller comprises a caster roller.

10. The tread drum of claim 2, wherein at least one of said rollers is provided with a brake to stop said drum from rolling.

11. The tread drum of claim 2, wherein each roller is surrounded by a wheel guard to prevent accidental pinching between the roller and the drum.

* * * * *